United States Patent
Yagnik (10) Patent No.: US 9,054,876 B1
(45) Date of Patent: Jun. 9, 2015

(54) FAST EFFICIENT VOCABULARY COMPUTATION WITH HASHED VOCABULARIES APPLYING HASH FUNCTIONS TO CLUSTER CENTROIDS THAT DETERMINES MOST FREQUENTLY USED CLUSTER CENTROID IDS

(75) Inventor: Jay Yagnik, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 393 days.

(21) Appl. No.: 13/314,294

(22) Filed: Dec. 8, 2011

Related U.S. Application Data (60) Provisional application No. 61/555,904, filed on Nov. 4, 2011.

(51) Int. Cl.
*G06F 17/00* (2006.01)
*H04L 9/32* (2006.01)

(52) U.S. Cl.
CPC .................................. *H04L 9/3236* (2013.01)
USPC ............................................................ 706/45

(58) Field of Classification Search
CPC ...................................................... H04L 9/3236
USPC ................................................ 706/12, 45, 62
See application file for complete search history.

(56) References Cited

U.S. PATENT DOCUMENTS

| | | | |
|---|---|---|---|
| 2006/0095521 A1* | 5/2006 | Patinkin | 709/206 |
| 2009/0048842 A1* | 2/2009 | Albrecht et al. | 704/260 |
| 2010/0017487 A1* | 1/2010 | Patinkin | 709/206 |
| 2010/0212015 A1* | 8/2010 | Jin et al. | 726/26 |
| 2011/0182513 A1* | 7/2011 | Eshghi et al. | 382/177 |
| 2013/0205014 A1* | 8/2013 | Muro et al. | 709/224 |
| 2014/0149376 A1* | 5/2014 | Kutaragi et al. | 707/706 |

* cited by examiner

*Primary Examiner* — David Vincent
(74) *Attorney, Agent, or Firm* — Middleton Reutlinger (57) ABSTRACT

The disclosed embodiments describe a method, an apparatus, an application specific integrated circuit, and a server that provides a fast and efficient look up for data analysis. The apparatus and server may be configured to obtain data segments from a plurality of input devices. The data segments may be individual unique subsets of the entire data set obtained by a plurality input devices. A hash function may be applied to an aggregated set of the data segments. A result of the hash function may be stored in a data structure. A codebook may be generated from the hash function results.

15 Claims, 4 Drawing Sheets

FAST EFFICIENT VOCABULARY COMPUTATION WITH HASHED VOCABULARIES APPLYING HASH FUNCTIONS TO CLUSTER CENTROIDS THAT DETERMINES MOST FREQUENTLY USED CLUSTER CENTROID IDS

BACKGROUND

Data may be provided by numerous types of data sources. Examples of data sources include cameras, microphones, cellular telephones, radios and electronic documents. Signals representing the data output from or, in the case of documents, the data in the document may be analyzed because the signals may contain a feature that is of interest to a user. For example, the image may contain an object that is to be recognized, or the audio signal or electronic document may contain a particular phrase or word.

One technique of analyzing data is by vector quantization. Vector quantization divides a data set into segments that may be represented as vectors. The vectors may be grouped into a plurality of groups using a nearest neighbor search algorithm such as, K-means, distance mapping or clustering. The output of the nearest neighbor search algorithm may be a vector that represents a center, or centroid, of each of the groups of vectors. There may be hundreds to thousands of centroids that are representative of data in an input data set. The centroid vector may be determined after a number of iterations of the nearest neighbor search. By representing the data set with a centroid vector, a complex or a large volume of data may be represented by a smaller data set. The centroid vectors may be used as codewords in a codebook for the particular groups of vectors. There may be a number of iterations through the data vectors to determine an optimal centroid vector that will be used as the final codeword. This iterative process may be called training of the codebook. The codewords may be of different lengths. Vector quantization can be used, for example, in signal analysis, image analysis, data compression and other data processing operations.

The data analysis performed by using vector quantization may be performed by comparing data of interest to each of the codewords in the codebook. This comparison can consume both time and resources. As a result, the comparisons may need the more powerful processors available only on servers or some desktop computers.

There are many computer operations that may be performed to narrow data sets such as K-means, clustering, hash functions, and the like. An exemplary hash function H is a transformation that takes a variable-size input m and returns a fixed-size string, which is called the hash value h (that is, h=H(m)). The hash value may be stored in a hash table that is indexed according to the respective hash values.

BRIEF SUMMARY

In an embodiment of the disclosed subject matter, a device may receive data and a vector quantizer executed by a processor may perform a vector quantization operation that arranges the data in vectors, clusters the data vectors into groups of similar data, and identifies centers, or centroids, of the clusters of data vectors. The cluster centroids may also be represented as vectors. A plurality of hash functions may be applied to the cluster centroids, and the hash values for the cluster centroids are indexed into a hash table. A codebook may be generated from the hash table.

A processor in the device may access the codebook using the hash index. Feature information related to the data may be identified based on the codebook. The obtained feature information may be processed to determine whether the data contains information related to a signal feature to be identified, or, for example, an object in an image. The result of the processing may be output by the device to a user display device.

In an embodiment of the disclosed subject matter, a processor may extract data segments from a data set. Each data segment may be configured in an array or a vector. A plurality of hash functions may be applied to the data segments and the results may be stored in a plurality of hash indices. The hash indices may be used to generate a codebook. The number of hash functions in the plurality of hash functions affects whether the analysis will be either a coarse or fine analysis.

In an embodiment of the presently disclosed subject matter, a server may be configured to obtain data segments from a plurality of input devices. The data segments may be individually unique subsets of the entire data set obtained by a plurality input devices. A hash function may be applied to an aggregated set of the data segments. A result of the hash function may be stored in a data structure. A codebook may be generated from the hash function results.

In an embodiment of the disclosed subject matter, an apparatus may include an image sensor, a microphone, a display device, a processor and a memory device. The processor may be configured to obtain a data segment from a data set. The data segment may be a subset of the data set. A hash function may be applied to the data segment. A result of the hash function may be stored in a hash index in data storage. A plurality of vocabulary words may be generated from the hash index values to form a codebook. The processor may also access the codebook. The processor may perform data analysis on the data segment. The result of the data analysis may be output by the processor.

In an embodiment of the disclosed subject matter, a server may include a processor configured to obtain a data segment from a data set. The data segment may be a subset of the data set. A hash function may be applied to the data segment. A result of the hash function in a hash index may be stored in a hash index in data storage. A plurality of vocabulary words may be generated from the hash index numbers to form may be stored as a vocabulary word in a codebook. The processor may also access the codebook. The processor may perform data analysis on the data patch segment. The result of the data analysis may be output by the processor.

In an embodiment of the disclosed subject matter, an application specific integrated circuit may be configured to obtain a data segment from a data set. The data segment may be a subset of the data set. A processor may apply a hash function to the data segment. A hash index resulting from the application of the hash function may be used as a vocabulary word in a codebook. The codebook may be stored in data storage for access by the processor. The processor may also access the codebook. The processor may perform data analysis on subsequently inputted data by referencing the codebook. The result of the data analysis may be output by the processor.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Data analysis is a computationally complex process. Part of the complexity is related to the continued comparison of the data being analyzed with data containing known features of interest, e.g., an object in an image, a pattern in a signal or the like. The known data may be stored in a codebook. For example, a codebook may contain hundreds to thousands of vocabulary words. Comparing input data to such a large data set is time consuming and resource intensive. It would be beneficial if the number of comparisons could be reduced so the analysis of the input data can be performed quicker, with fewer resources, and more efficiently. The disclosed subject matter facilitates the more efficient and faster analysis of data.

Figure 1:
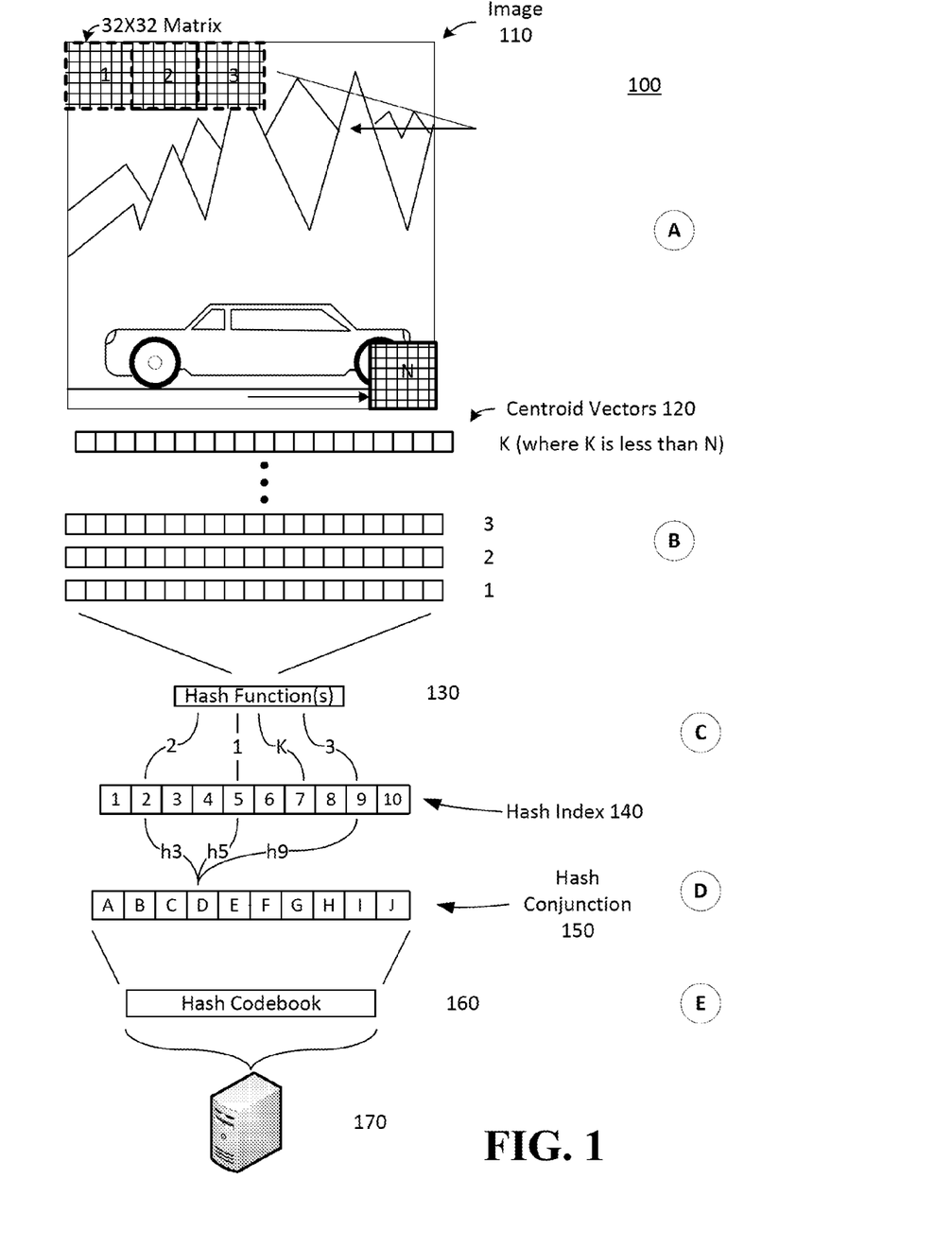
FIG. 1 shows an exemplary implementation according to an embodiment of the disclosed subject matter.

FIG. 1 illustrates an exemplary implementation according to an embodiment of the disclosed subject matter. At step A of the implementation 100, an input image 110 may have been collected by a sensor, such as a camera, microphone, or telephone, or may be stored in data storage. In order to analyze the image 110, the pixel values in the image may be collected by scanning a matrix of a given size, for example, a 32×32 matrix, over the image 110. Each element of the matrix may contain a pixel value of the image 110. Each matrix, e.g., 32×32 matrix, may be formed into a 1024 element vector by reading out the matrix elements in, for example, row order. N vectors may be generated from a complete scan of the entire image 110, where N is an integer. Each of the 1024 elements in the data vector may contain a pixel value of X-bits. In an exemplary image analysis process, the X-bit pixel values may be compared to a threshold value to enhance contrast in the image, which makes edges of objects easier to detect. For example, the edges of the mountains in comparison to the sky or the edges of the automobile in the foreground in comparison to the background scenery in the image 110 may provide different pixel values, and as a result of the threshold comparison, the matrix values that correspond to the edges of the automobile and the mountains may be set to a maximum value (e.g., 256) and the other pixel values (e.g., the sky) may be set to a minimum (e.g., 0). This is but one example of a method for performing image analysis that may be used to process the pixels and provide a data set that contains feature data. Alternatively, no additional processing may be performed on the input image data and the original pixel values may be used as the vector elements. A device, such as a server, desktop computer, laptop computer, a tablet computer, a camera, PDA or similar devices, may receive the data vectors. Continuing with the example of FIG. 1, a processor in the device may perform vector quantization on the data vectors obtained from scanning the image.

For example, the N vectors may be quantized according to known vector quantization techniques. The number of vectors may be limited to a set of vectors that are representative of a subset of the N vectors. The subset of vectors may be considered examples, or centroids. At step B, the N vectors may be grouped into K clusters, where K is an integer less than N. Iteratively, the clusters will be formed, or trained, so that approximately the same number of vectors belongs to each cluster. Once the clustering process has settled to an appropriate threshold, a centroid vector for each of the K clusters may be determined. The centroid vector may represent the mean of all of the vectors in the cluster. Each centroid vector may be assigned an identifier. Any number of different mathematical functions may be used perform the clustering and determine a centroid of each of the K clusters. For example, a K-means clustering algorithm may be used.

At step C, the K centroid vectors 120 may be used as inputs into a plurality of hash functions 130. The centroid vector may be indexed into a hash table for each of the applied plurality of hash functions 130. For example, as shown in FIG. 1, the centroid vector 1 may be assigned to hash bin number 5 based on the hash value of the centroid vector 1, centroid vector 2 into hash bin number 2, centroid vector 3 into hash bin 9, and centroid vector K into hash bin number 7.

A codebook containing a plurality of vocabulary words may be generated directly from the hash table indices. However, codebooks may be initialized to be a certain size in memory. At times the plurality of hash functions may not have enough indices to fill the codebook. In order to fill the allocated codebook memory, a plurality of hash conjunctions may be generated by combining the results of hash indices. Alternatively, a codebook may have a maximum number of entries, and the hash functions may generate a number of hash results greater than the maximum number of entries. In order to reduce the number of hash indices, the hash indices may be combined in a conjunction of hash indices.

For example, a codebook may be arranged to have code words (i.e., vocabulary words) of 10 bits, while the hash functions may output a 2 bit hash index. Each hash index may take 2 values between 1-4 (or 0-3). Each hash index may be represented as a binary vector of length 4, and may have a 1 whenever that value is present. For example, five (5) 2-bit hash indices may be concatenated together to form a 10-bit vocabulary word to fill the codebook. Alternatively, the hash function results may be combined using vector operations. Continuing with the example, multiple two bit hash codes may be combined. In the example, if a first hash h1 takes values 2 and 3, it may have a vector representation such as h1=[0 1 1 0]. To combine two hashes together (the second hash being h2=[1 1 0 0]) as a conjunction, an outer product vector operation of hash h1 vector and hash h2 vector may be used to produce the conjunction. The outer product may be determined by:

$$h1 * \text{transpose}(h2) = [0\ 0\ 0\ 0\ 1\ 1\ 0\ 0\ 1\ 1\ 0\ 0\ 0\ 0\ 0\ 0]. \quad \text{(Eq. 1)}$$

The outer product produces a matrix as shown in Eq. 1 that is the conjunction of h1 and h2. The conjunction (h1*transpose (h2)) matrix may be read out as a vector in the row-wise order. For example, a vector representation of the conjunction (h1, h2) from Eq. 1 may be [0 0 0 0 1 1 0 0 1 1 0 0 0 0 0], and may be a new hash function combining h1 and h2. The conjunction (h1, h2) may be combined with h3 in the same way: conjunction (h1, h2, h3)=conjunction (conjunction (h1, h2), h3), i.e., the outer product of the conjunction (h1, h2) vector and a vectorized h3 hash value may be taken to produce the conjunction (conjunction (h1, h2), h3). The outer product operation used to produce the conjunction is commutative, so the conjunction may be formed in any order (e.g., conjunction (conjunction (h3, h2) h1)).

If a codebook can be generated from the individual hash indexes, then conjunctions using the combinations of hashes may not be needed. If so, the conjunction determination process of step D may be omitted.

At step E, the hash codebook 160 may be generated from the hash indices or conjunctions by the processor 170 and stored in a data storage (not shown). Each bin in the codebook 160 may contain a hash value of a cluster centroid ID as a vocabulary word. More than one cluster centroid may be assigned to a single bin in the codebook 160. The codebook 160 may be used to identify features in the data.

For example, during data analysis operations, the codebook data, such as cluster identifiers, may be accessed using a hash index of the codebook bins. The data to be analyzed may have hash functions applied to it, and the resulting hash index may be used to retrieve related data feature information from the codebook. The obtained feature information may be analyzed to determine whether the data contains information related to a signal to be identified, such as an object in an image, a face in an image, or the like. A result of the processing may be output to a display or otherwise provided to a user.

Alternatively, the hash functions 130 may be applied directly to data vectors generated from each of the 32×32 matrices that are scanned over the image 110. In this embodiment, the hash index 140 may have N index values. Some of the N index values may be combined into hash conjunctions 150 as previously explained. A hash codebook 160 may be generated by applying by a processor 170.

Although only a single scene from one perspective is shown in FIG. 1, multiple scenes of an object, which may be taken from multiple perspectives and/or by multiple devices, may be used. For example, in an athletic stadium setting, multiple cameras or multiple microphones may obtain image and audio data respectively, and the obtained data may be processed as described in FIG. 1. In this embodiment, the data from the multiple cameras or microphones may be processed.

The above described example was described with respect to an image input signal, but it will be understood that the disclosed subject matter may also be applied to an audio signal, or any other type of signal.

Figure 2:
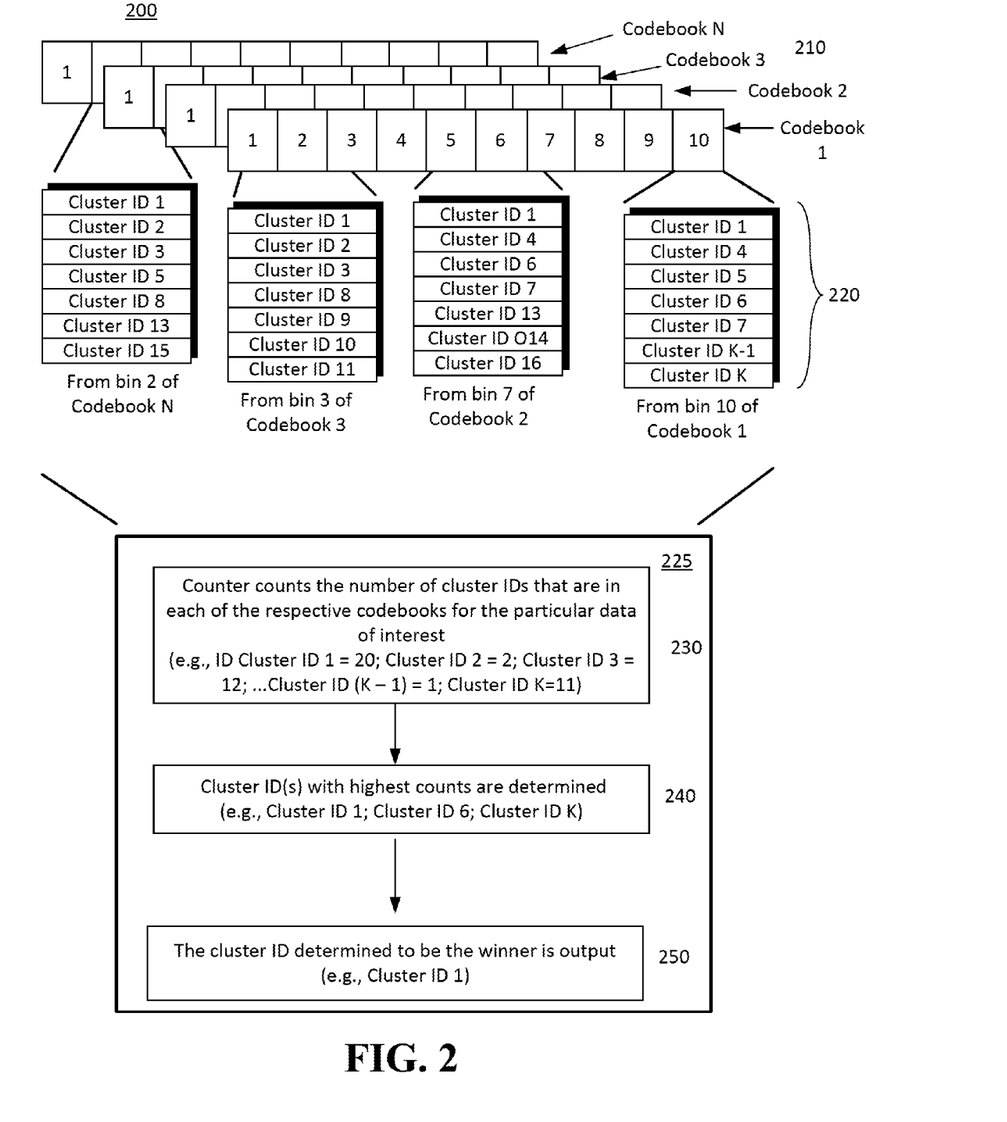
FIG. 2 shows an illustrated example of a data look-up procedure according to an embodiment of the disclosed subject matter.

FIG. 2 shows an illustrated example of a data look-up procedure according to an embodiment of the disclosed subject matter. A processor 225 may have access to a plurality of codebooks 210 that may be stored in a data storage. The codebooks 210 may be pre-built using earlier data containing data with a known feature. A known feature may be an object in an image, a character in an electronic document, a signal having a known pattern, or the like. The plurality of codebooks may be generated by application of a vector quantization operation and a plurality of differing hash functions to the data containing the known feature as discussed with respect to FIG. 1. For example, each of the plurality of codebooks may be generated by individual ones of the plurality of differing hash functions. Each hash function may produce a different index for each centroid vector to which the hash function is applied. The results of the hash function may be stored in respective bins related to the hash function. Any hash function, such as MD4, rotating, additive, CRC, or Pearson's hash, may be used to generate the codebooks. The hash functions can be a function in which a high probability of collision between inputted values may indicate a high probability of similarity. A high number of collisions between a number of different inputs may indicate that the inputs are similar. Using a threshold value, the vectors can be assigned to a respective bin. Hash functions are typically configured to not allow two different data sets to return the same results and thereby occupy the same index. However, the hash function may be configured to have a tolerance that allows more than one data set to be assigned to the same index based on, for example, the respective centroids probability of colliding with each other when the hash function is applied. In the latter case, a plurality of centroids may be indexed into one of the bins in the hash table. The different hash bins may be used as vocabulary words in the respective codebook. In the example 200 of FIG. 2, a codebook 210 may have a plurality of bins (e.g., 1024). The example illustrated in FIG. 2 shows codebooks 210 with 10 bins for ease of explanation. Of course, more or less bins may be used in the codebooks. Each of the bins may contain a list 220 containing a plurality of cluster centroid IDs ranging from 1-K. The variable K may represent the total number of cluster centroid IDs available for distribution among the plurality of bins, and each bin will contain some portion of the total number of clusters centroid IDs available for distribution. Note that N and K may or may not be equal. Each of the plurality of cluster centroid IDs may be a vocabulary word. The lists 220 may contain overlapping cluster centroid IDs. For example, based on the application of the hash function, bin 10 of codebook 1 may contain cluster IDs 1, 4-7, K−1 and K, while bin 2 of codebook N may contain cluster IDs 1, 2, 3, 5, 8, 13, and 15. In the example, cluster centroid ID 1 may be considered an overlapping cluster centroid ID. Codebooks 3 to N may be similarly arranged. As mentioned with respect to FIG. 1, the respective cluster centroid IDs may also represent a conjunction of hash indices. In this case, the cluster centroid ID may represent several hashes that have been combined as a conjunction. The operation of the hash function may populate the codebooks 210 with cluster centroid IDs to form the lists of cluster IDs 220. The codebooks 210 generated without performing the vector quantization may now be used for data analysis processes as well as other processes, such as compression.

An example of data analysis may be an application or a user that is interested in whether a particular set of data contains a signal of interest or a portion of an object (e.g., a type of automobile, text character or some other data of interest). The application may be executed on a processor 225. The processor 225 may be configured to execute program instructions for implementing a look up table process. In a data analysis operation, an input data vector (such as centroid vector 120 from FIG. 1) containing data related to an object of interest may have the plurality of hash functions applied to it. Each hash function may produce a hash index. Each hash index may be used as a vocabulary word, or a look up value, to the related bin in the respective codebook 210. Once the hash indexes are determined, the codebooks may be accessed, and a counter at 230 may begin counting the number of the cluster IDs in the lists 220 listed in each particular hash bin. For example, each codebook 1-N in the list of codebooks 210 may have at least one cluster ID assigned to it. As shown in FIG. 2, cluster ID 1 was found in 20 different codebook, cluster ID 2 was found in 2 codebooks, cluster ID 3 in 2 codebooks, and so on, until cluster ID K, which was found in 11 codebooks. Once all of the codebooks 210 have been accessed, and the counter at 230 has counted the cluster IDs in each list 220, the counter at 240 may identify the cluster IDs that were listed most often in the identified hash bins of the codebooks. In the present example, the counter identified cluster ID 1 as being listed most often. Cluster ID 6 was identified as the next most frequently listed cluster ID, and cluster ID 3 as the third most often listed cluster ID. The quantity of cluster IDs listed as being most frequently based on a threshold (e.g., top 3, top 5 or top 10) that may be assigned by a user, or automatically by a computer application. In the present example, three cluster IDs (1, 6 and 3) have been identified at 240. The processor 225 may output a signal indicating the most frequently listed cluster ID as the result of the data analysis. These most frequently listed cluster IDs may represent the centroids of data vectors that most closely resemble the input data vector. The processor 225 may output signals representing the most frequently listed cluster IDs for the data being analyzed. The number of cluster IDs identifiers output may be based on a threshold that may be set by a user or by a computer application. The threshold may depend upon the type of data analysis that is being performed. For example, character recognition may have a different threshold for the number of identified cluster IDs than voice recognition. In summary, the hashed codebooks allow a vector quantized data set to be segmented into smaller data sets that can be more easily searched to allow the respective vector data to be accessed, and used for data analysis purposes.

Figure 3:
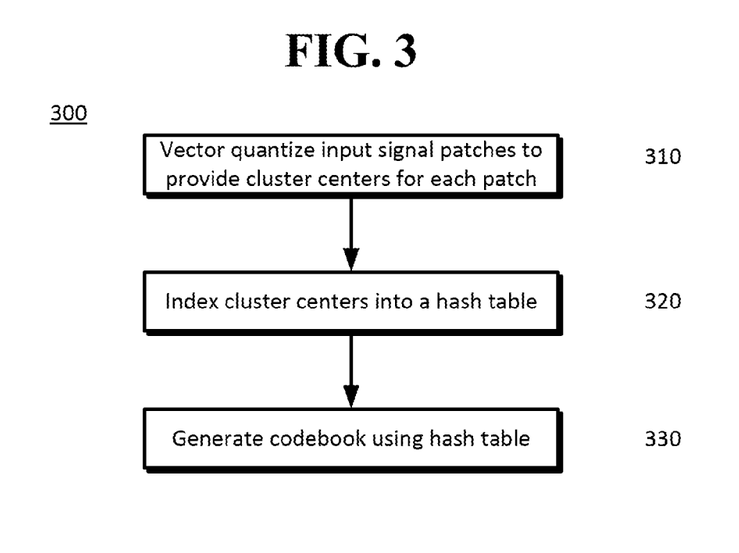
FIG. 3 shows method of performing a vocabulary look up according to an embodiment of the disclosed subject matter.

FIG. 3 shows a method of performing a vocabulary look up according to an embodiment of the disclosed subject matter. In FIG. 3, a processor may perform the process 300 in response to receiving either an input signal, such as an audio signal from data storage or from a microphone, or a video signal from data storage or an image sensor according to an embodiment of the disclosed subject matter. At step 310, an input signal segment may be vector quantized to provide a cluster center for each segment. An input signal segment may be a portion of an entire input signal. An example may be the input vector derived from the image of FIG. 1. The vector quantization may require training, or multiple iterations of determining a cluster center, to arrive at a final cluster center, or centroid. The cluster centers may be applied to a hash function. At step 320, the processor may index the cluster centers into a hash table by applying the hash functions. The hash table may be used to generate a hash table that may be used for data analysis as explained above with reference to FIG. 2. This process may leverage known vector quantization processes presently used in signal processing.

Figure 4:
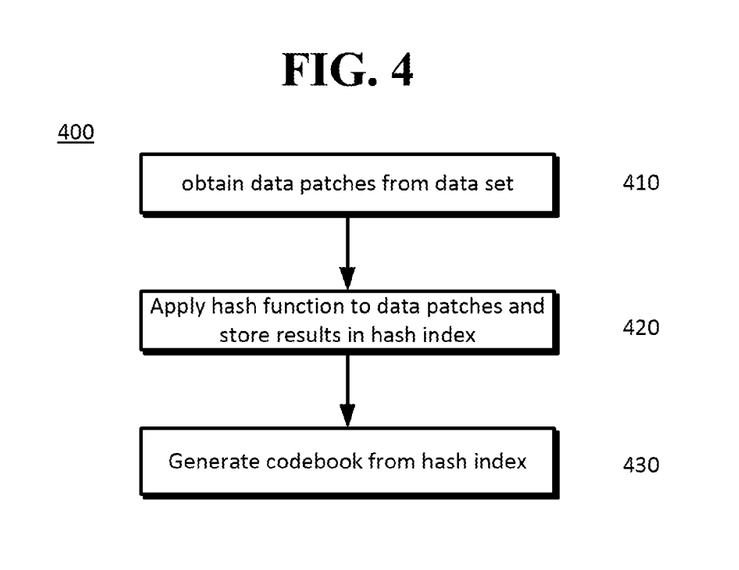
FIG. 4 shows an alternative method of performing a vocabulary look up according to an embodiment of the disclosed subject matter.

An embodiment of the disclosed subject matter may provide additional efficiencies for performing a vocabulary look-up by eliminating the need for training the data set to arrive at the cluster centroid during vector quantization. FIG. 4 shows an alternative process 400 for performing fast vocabulary look up according to an embodiment of the disclosed subject matter. In the process 400, the data may be processed in segments of data as in vector quantization. At step 410, the data segments may be obtained from the data set. A hash function may be applied to the data segment at step 420, and the results of the hash function may be stored in a hash index. A codebook at step 430 may be generated from the hash index. The hash index number may be a vocabulary word in a codebook. These codebooks may be accessed and used for data analysis as discussed above with respect to FIG. 4.

Figure 5:
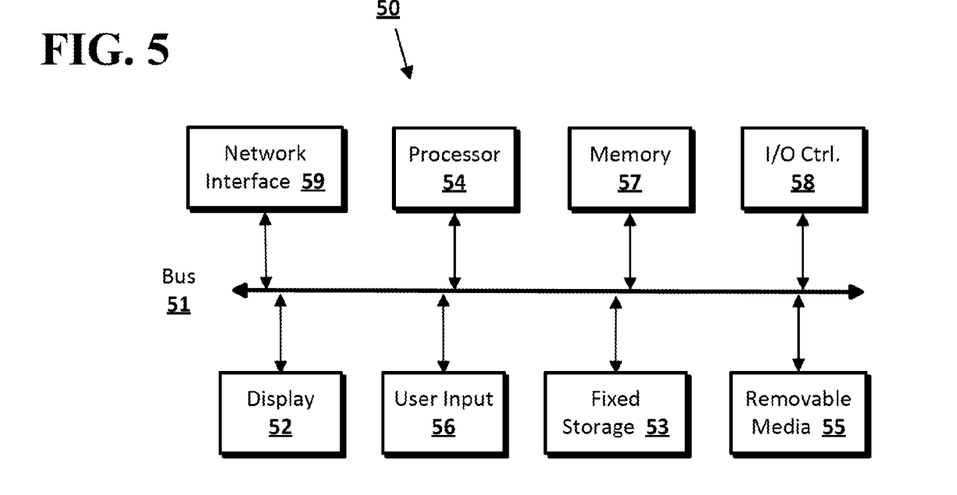
FIG. 5 shows a computer according to an embodiment of the disclosed subject matter.

Embodiments of the presently disclosed subject matter may be implemented in and used with a variety of component and network architectures. FIG. 5 is an example computer 50 suitable for implementing embodiments of the presently disclosed subject matter. The computer 50 includes a bus 51 which interconnects major components of the computer 50, such as a central processor 54, a memory 57 (typically RAM, but which may also include ROM, flash RAM, or the like), an input/output controller 58, a user display 52, such as a display screen via a display adapter, a user input interface 56, which may include one or more controllers and associated user input devices such as a keyboard, mouse, and the like, and may be closely coupled to the I/O controller 58, fixed storage 53, such as a hard drive, flash storage, Fibre Channel network, SAN device, SCSI device, and the like, and a removable media component 55 operative to control and receive an optical disk, flash drive, and the like. In addition, the computer 50 may be a personal digital assistant, a smartphone, a camera, a laptop computer, a table computer, a desktop computer or a server.

The bus 51 allows data communication between the central processor 54 and the memory 57, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 50 are generally stored on and accessed via a computer readable medium, such as a hard disk drive (e.g., fixed storage 53), an optical drive, floppy disk, or other storage medium 55.

The fixed storage 53 may be integral with the computer 50 or may be separate and accessed through other interfaces. A network interface 59 may provide a direct connection to a remote server via a telephone link, to the Internet via an internet service provider (ISP), or a direct connection to a remote server via a direct network link to the Internet via a POP (point of presence) or other technique. The network interface 59 may provide such connection using wireless techniques, including digital cellular telephone connection, Cellular Digital Packet Data (CDPD) connection, digital satellite data connection or the like. For example, the network interface 59 may allow the computer to communicate with other computers via one or more local, wide-area, or other networks, as shown in FIG. 6.

Many other devices or components (not shown) may be connected in a similar manner (e.g., document scanners, digital cameras and so on). Conversely, all of the components shown in FIG. 1 need not be present to practice the present disclosure. The components can be interconnected in different ways from that shown. The operation of a computer such as that shown in FIG. 1 is readily known in the art and is not discussed in detail in this application. Code to implement the present disclosure can be stored in computer-readable storage media such as one or more of the memory 57, fixed storage 53, removable media 55, or on a remote storage location.

Figure 6:
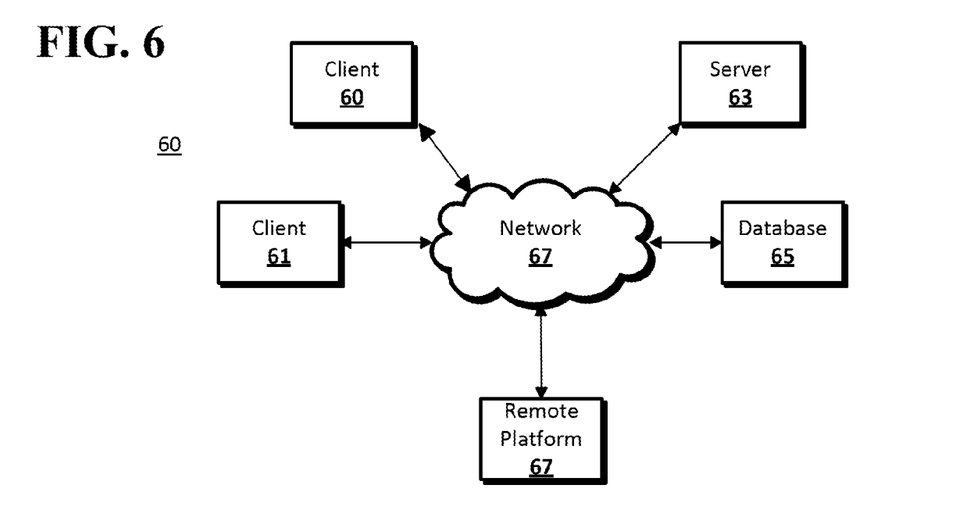
FIG. 6 shows a network configuration according to an embodiment of the disclosed subject matter.

FIG. 6 shows an example network arrangement according to an embodiment of the disclosed subject matter. One or more clients 60, 61, such as local computers, smart phones, tablet computing devices, and the like may connect to other devices via one or more networks 67. The network may be a local network, wide-area network, the Internet, or any other suitable communication network or networks, and may be implemented on any suitable platform including wired and/or wireless networks. The clients may communicate with one or more servers 63 and/or databases 65. The devices may be directly accessible by the clients 60, 61, or one or more other devices may provide intermediary access such as where a server 63 provides access to resources stored in a database 65. The clients 60, 61 also may access remote platforms 67 or services provided by remote platforms 67 such as cloud computing arrangements and services. The remote platform 67 may include one or more servers 63 and/or databases 65.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

What is claimed is:

1. A method comprising:
   receiving data at a device, wherein the data is represented as a vector;
   performing, by a processor in the device, vector quantization to identify clusters of data vectors and the centroids of the clusters of data vectors, wherein the centroids of the clusters of data vectors are represented as vectors;
   applying a plurality of hash functions to the cluster centroids;
   indexing the output of the plurality of hash functions into a plurality of respective hash tables;
   generating a code book from each of the plurality of hash tables, wherein each entry in the code book contains at least one identifier of a cluster centroid;
   receiving signal data to be analyzed;
   applying the plurality of hash functions to the received data to be analyzed, wherein the application of the applied plurality of hash functions generates a hash index;
   accessing the respective codebooks using the hash index;
   retrieving cluster centroid identifiers from the respective codebooks;
   determining which of the cluster centroid identifiers is most frequently retrieved; and
   outputting a signal identifying the most frequently retrieved cluster centroid identifier.

2. The method of claim 1, wherein accessing the respective codebooks using the hash index comprises accessing the respective codebooks using the hash index as a look up value.

3. The method of claim 1, wherein the centroids of the clusters of data vectors each represent a mean of all of the data vectors of a respective cluster of the clusters of data vectors.

4. The method of claim 1, wherein the received data to be analyzed is an audio signal.

5. The method of claim 1, wherein the received data to be analyzed is an image signal.

6. A system comprising:
   a processor configured to:
   receive data at a device, wherein the data is represented as a vector;
   perform vector quantization to identify clusters of data vectors and the centroids of the clusters of data vectors, wherein the centroids of the clusters of data vectors are represented as vectors;
   apply a plurality of hash functions to the cluster centroids;
   index the output of the plurality of hash functions into a plurality of respective hash tables;
   generate a code book from each of the plurality of hash tables, wherein each entry in the code book contains at least one identifier of a cluster centroid;
   receive signal data to be analyzed;
   apply the plurality of hash functions to the received data to be analyzed, wherein the application of the applied plurality of hash functions generates a hash index;
   access the respective codebooks using the hash index;
   retrieve cluster centroid identifiers from the respective codebooks;
   determine which of the cluster centroid identifiers is most frequently retrieved; and
   output a signal identifying the most frequently retrieved cluster centroid identifier.

7. The system of claim 6, wherein the processor is configured to access the respective codebooks using the hash index as a look up value.

8. The system of claim 6, wherein the centroids of the clusters of data vectors each represent a mean of all of the data vectors of a respective cluster of the clusters of data vectors.

9. The system of claim 6, wherein the received data to be analyzed is an audio signal.

10. The system of claim 6, wherein the received data to be analyzed is an image signal.

11. A non-transitory computer-readable storage medium with an executable program stored thereon, wherein the program instructs a processor to perform the following steps:
    receiving data at a device, wherein the data is represented as a vector;
    performing, by a processor in the device, vector quantization to identify clusters of data vectors and the centroids of the clusters of data vectors, wherein the centroids of the clusters of data vectors are represented as vectors;
    applying a plurality of hash functions to the cluster centroids;

indexing the output of the plurality of hash functions into a plurality of respective hash tables;
generating a code book from each of the plurality of hash tables, wherein each entry in the code book contains at least one identifier of a cluster centroid;
receiving signal data to be analyzed;
applying the plurality of hash functions to the received data to be analyzed, wherein the application of the applied plurality of hash functions generates a hash index;
accessing the respective codebooks using the hash index;
retrieving cluster centroid identifiers from the respective codebooks;
determining which of the cluster centroid identifiers is most frequently retrieved; and
outputting a signal identifying the most frequently retrieved cluster centroid identifier.

12. The non-transitory computer-readable storage medium of claim 11, wherein accessing the respective codebooks using the hash index comprises accessing the respective codebooks using the hash index as a look up value.

13. The non-transitory computer-readable storage medium of claim 11, wherein the centroids of the clusters of data vectors each represent a mean of all of the data vectors of a respective cluster of the clusters of data vectors.

14. The non-transitory computer-readable storage medium of claim 11, wherein the received data to be analyzed is an audio signal.

15. The non-transitory computer-readable storage medium of claim 11, wherein the received data to be analyzed is an image signal.

* * * * *